United States Patent [19]
Tripp et al.

[11] Patent Number: 5,361,218
[45] Date of Patent: Nov. 1, 1994

[54] SELF-CALIBRATING SENSOR

[75] Inventors: Roger M. Tripp, Newbury Park; Dennis J. Woods, Reseda, both of Calif.

[73] Assignee: ITT Corporation, New York, N.Y.

[21] Appl. No.: 209,984

[22] Filed: Mar. 8, 1994

Related U.S. Application Data

[63] Continuation of Ser. No. 929,032, Aug. 11, 1992, abandoned.

[51] Int. Cl.$^5$ ............................................. G01K 15/00
[52] U.S. Cl. ............................ 364/571.01; 364/571.03
[58] Field of Search ....................... 364/571.03, 571.01

[56] References Cited

U.S. PATENT DOCUMENTS

| | | | |
|---|---|---|---|
| 4,399,515 | 8/1983 | Gross | 364/571.03 |
| 4,592,002 | 5/1986 | Bozarth, Jr. et al. | 364/571.03 |
| 4,644,482 | 2/1987 | Juanarena | 364/571.03 |
| 4,715,003 | 12/1987 | Keller et al. | 364/571.03 |
| 4,817,022 | 3/1989 | Jornod et al. | 364/571.03 |
| 5,135,002 | 8/1992 | Kirchner et al. | 364/571.03 |

*Primary Examiner*—Jack B. Harvey
*Assistant Examiner*—Thomas Peeso
*Attorney, Agent, or Firm*—M. J. Lombardi

[57] ABSTRACT

A pressure sensor is electronically corrected for inherent and temperature induced errors. The sensor is characterized with a four term, third order equation. The sensor behavior coefficients for the four terms are themselves each characterized with a three term, second order equation that tracks how the four coefficients change with respect to temperature. The temperature effect coefficients for the three terms in each of the four equations, twelve coefficients in all, are stored in memory. In operation, a microprocessor measures the temperature, retrieves the 12 temperature effect coefficients, solves the four second order equations to obtain the four sensor behavior coefficients, solves the third order equation using the four sensor behavior coefficients and the sensor output to yield the true pressure. In this way, the full spectrum error map of the pressure sensor can be remembered with just 12 coefficients using only 72 bytes of onboard memory. The small memory requirement allows use of fast internal microprocessor memory and easy field recalibration.

10 Claims, 2 Drawing Sheets

SELF-CALIBRATING SENSOR

This application is a continuation of application Ser. No. 07/929,032, filed Aug. 11, 1992, now abandoned.

TECHNICAL FIELD

This invention relates to sensors for pressure, temperature, and the like that have their output electronically corrected to compensate for inherent non-linearity, end point, temperature dependent, and other errors, particularly sensors using digital processor controlled correction circuits.

BACKGROUND OF THE INVENTION

It is known in the art to use built in electronic correction circuits with sensors that measure pressure, temperature, and other physical quantities so as to make the sensor output more linear and proportional to the measured quantity. Such correction circuits are needed because the output of sensors may vary from ideal by ten percent or more.

One prior art correction technique uses analog compensation of the output voltage with elaborate networks of resistors and amplifiers. But the compensating components must be very stable and are thus expensive. In addition, a great deal of expensive manufacturing labor is consumed to measure the errors, calculate the size and value of the compensating components, and verify the proper correction of the errors after the installation of the correcting components. The process usually must be repeated several times to reduce the error even below 2 percent of full scale output. Finally, it is entirely possible that component value drift over time may increase the output error again. So this method is very unsatisfactory.

Another prior art technique uses digital correction which can be as accurate as desired, and more stable, but is very expensive. This method uses a large look up table, in a suitable memory, which maps all of the sensor errors for the range of possible outputs and for all other variables that could affect output, such as temperature. This method is less complex than analog designs. But the manufacturing time needed to gather all the data for the table makes this approach expensive. Furthermore, in order to achieve higher accuracies, very large memories are needed to hold the table. Also, it is impractical to recalibrate the sensor in the field for large tables which could easily contain as many as 32 thousand bytes. The present invention avoids these problems with an accurate digital approach that does not have massive memory requirements.

STATEMENT OF THE PRIOR ART

U.S. Pat. No. 4,192,005 discloses a pressure transducer with digital correction circuitry. A multitude of look up tables are utilized to obtain the correct zero offset for the prevailing temperature, and the correct pressure for the indicated pressure at the prevailing temperature. These values are then multiplied by fixed constants A and B that correct for incremental pressure variations, that is, the nonlinearity of this particular sensor as measured at the time of manufacture. This patent suffers from the limitations discussed above in that very large memories are needed to store all the correct pressures for all the indicated pressures at all the possible temperatures. Many thousands of bytes will be needed for any reasonable accuracy.

U.S. Pat. No. 4,303,984 shows a sensor with a 256 byte on board memory that can be externally accessed to look up the corrected output at 256 points. The assumption is made that the sensor will always be in a similar environment and temperature when used so that the 256 corrections will always be appropriate. Accordingly, even though a fairly large memory is used, accuracy is low.

U.S. Pat. No. 4,399,515 discloses a self correcting pressure sensor in which zero offset corrections, thermal sensitivity shifts, and pressure offsets are stored in three comparatively large memories and accessed by 64 discrete temperature values used as addresses. Again, a large memory array is used to achieve a relatively low accuracy.

U.S. Pat. No. 4,468,968 teaches a pressure transducer that is corrected for zero shift and sensitivity changes at the high and low temperature extremes only. The actual corrections for the measured temperature are derived by interpolation, thus, assuming that corrections are linear with temperature. Memory requirements are reduced at a substantial loss in accuracy for intermediate temperatures.

U.S. Pat. No. 4,873,655 shows a pressure transducer compensated for non-linearity only, not temperature. For an indicated pressure, a look up table gives the size of an analog voltage to be combined with the sensor generated voltage.

None of these patents anticipate the high accuracy, low memory requirement design utilized by the instant invention.

STATEMENT OF THE INVENTION

This invention is first described herein with respect to a solid state pressure sensor, but as will be described below, the principles apply, in general, to other type sensors as well.

Briefly, the present invention utilizes a third order sensor behavior characterizing equation of the form:

$$SCP = A_0 + A_1 P + A_2 P^2 + A_3 P^3$$

where P is the sensor indicated pressure and SCP is the sensor behavior corrected pressure. In theory, any non-linear curve can be replicated with an equation of this form provided sufficient higher order terms are included. For a reasonably good accuracy, four terms are sufficient to characterize a typical pressure sensor of the type described herein. The four sensor behavior coefficients $A_0$–$A_3$ are temperature dependent and need to be calculated from four second order coefficient behavior characterizing equations (in this case, effect of temperature equations) of the form:

$$A_0 = B_0 + B_1 T + B_2 T^2$$

where T is the temperature at which the sensor is operating and the three temperature effect coefficients $B_0$–$B_2$ are stored in memory during manufacture. Three temperature effect coefficients for each of four equations requires a total of only twelve coefficients that need to be stored in order to fully characterize a particular sensor. This should be compared to the prior art method wherein thousands of errors need to be stored in look up tables to characterize a sensor to the same accuracy. Thus, the instant invention allows a very accurate sensor that is less expensive and which updates much faster.

In general, this invention may be used to permit self calibration of any sensor that has inherent non-linearities, even when these non-linearities vary with some independent environmental variable like temperature. The sensor output curve is fitted during manufacture to a multiple order sensor behavior characterizing equation having as many terms as needed to obtain the desired accuracy. The preferred embodiment, for example, uses a four term, third order equation to achieve an accuracy of one half percent of full scale output. The coefficients of each term of the multiple order sensor behavior characterizing equation are then examined to see how they change with respect to the independent environmental variable. This curve is also describable with a multiple order equation that characterizes the change in the examined coefficient with respect to the independent environmental variable. The coefficients of each term of the multiple order coefficient behavior characterizing equation are then stored in a memory that accompanies the sensor. During operation of the sensor, a microprocessor reads the value of the independent environmental variable and uses that, along with the memory stored coefficients, to calculate the multiple order coefficient behavior characterizing equations and derive the coefficients for the terms of the multiple order sensor behavior characterizing equation. The sensor behavior equation is then calculated using these derived coefficients and the value of the raw sensor output to produce the corrected or calibrated sensor output. If the sensor is non-linear with respect to other independent environmental variables, it can be corrected for these, as well, merely by establishing a few more coefficients and retaining them in memory. Indeed, the more erratic the sensor, the more efficient the present invention becomes. Additional benefits and advantages will become apparent from the drawings and detailed description that follows.

DETAILED DESCRIPTION OF THE INVENTION

Figure 1:
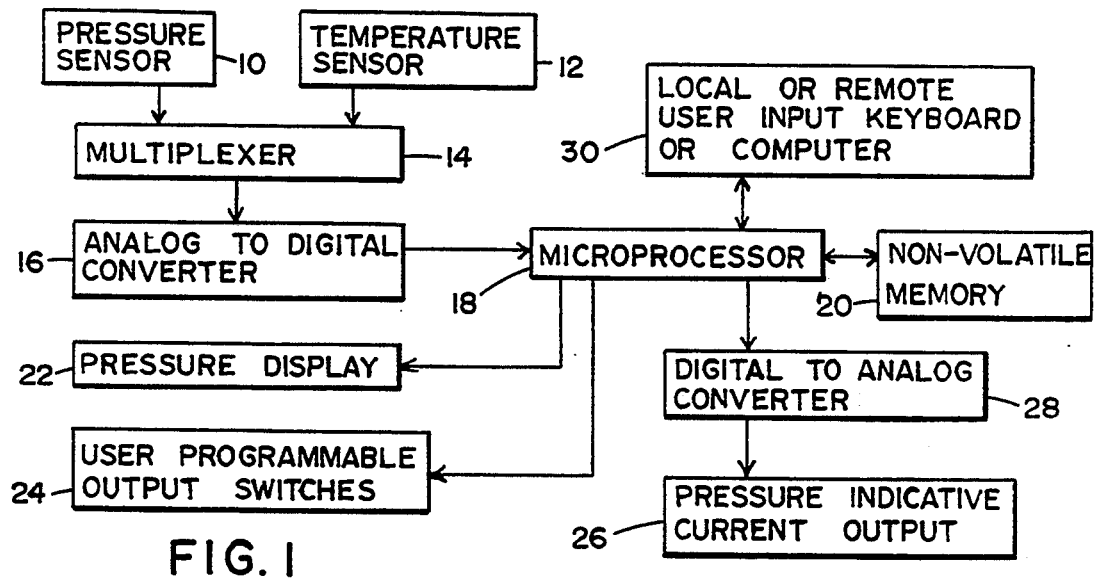
FIG. 1 is a schematic block diagram of the self correcting circuits associated with the sensor of the present invention.

FIG. 1 shows a general schematic diagram of the self calibrating circuits associated with the sensor of this invention. The principles of this invention may be applied to any sensor used to measure physical quantities such as temperature, light intensity, radiation, force, or position. However, for the purposes of this specification, the output correcting circuits are described in conjunction with a solid state pressure sensor 10. Sensor 10 is corrected for output errors arising from inherent non-linearity, temperature, age, electronic component drift, and all other output changing extraneous factors. Provision is also made for the user to field calibrate the sensor whenever desired.

Because of the output correcting circuits shown in FIG. 1, a lower cost sensor 10 may be used. For example, a sensor 10 with a twelve percent variation over the operational temperature range is perfectly acceptable. The correcting circuits still achieve a final accuracy of plus or minus a half percent.

The analog raw voltage output from sensor 10 is sampled periodically, along with an analog voltage signal from a temperature sensor 12, by a multiplexer 14. An analog to digital converter 16 converts the signals to a 12 bit digital word, in the preferred embodiment, which is read by a microprocessor 18 in a manner well known to those skilled in the art. Processor 18 follows a program or procedure, as described with respect to FIGS. 2 and 3, that uses the temperature information from sensor 12 to calculate a series of four sensor behavior correction coefficients. The four sensor behavior coefficients are substituted into the third order sensor behavior characterizing equation that yields the true pressure from the sensor indicated pressure. Calculation of the four sensor behavior coefficients requires, in turn, twelve temperature effect coefficients stored in a nonvolatile memory 20. These twelve temperature effect coefficients are placed in memory during the manufacturing process by an automated, computer run process, wherein the sensor and its associated electronics are measured and characterized as a set. The sensor is subjected to a variety of pressures at a variety of temperatures while monitoring the analog voltage output of the sensor. Each sensor and electronics set will respond differently.

An ideal sensor would give a linear response, increasing its output voltage by equal increments for equal pressure increments. But real world sensors never do this. Real world sensors have a voltage output even at zero pressure. This zero pressure voltage changes with temperature, with the square of the temperature, and even with higher order terms. To achieve the accuracy of one half percent mentioned above, at a reasonable speed of calculation, the preferred embodiment of this invention measures and records the coefficients of the zero, first, and second order terms of the effect of temperature equation for the zero pressure voltage output. Also, the coefficients of the zero, first, and second order terms of the effect of temperature equations for the pressure, pressure squared, and pressure cubed terms of the sensor behavior characterizing equation are determined and stored. These twelve coefficients are calculated by a multi-order, least squares fit numerical process well known to those skilled in the art.

A total of twelve temperature effect coefficients are stored in memory 20 during the manufacturing process. The calculation that uses these twelve coefficients is described with respect to FIG. 3. But the end result is an accurate pressure signal from processor 18 that may be displayed on display 22, in FIG. 1, or used to trigger user programmable switches 24, or used to create an analog output current 26 with a converter 28.

Processor 18 is also connected to a local or remote user input interface 30. Interface 30 allows the user to program various features of the sensor including the set points of switches 24, password protection, display blanking, and switch configuration. Since the sensor typically changes response characteristics over time, the user may also use interface 30 to recalibrate the system, testing the unit with known pressures, at a fixed temperature, and entering the change in the output voltage at zero pressure and at full scale pressure in memory 20.

Only 72 bytes of memory are required to store the twelve coefficients. A look up table for all of the possible temperature and pressure combinations needed to achieve a similar accuracy of one half percent, such as used in the prior art, would occupy about 32 thousand bytes of memory. This enormous memory requirement is very expensive to include with each sensor. And recalibration of 32 thousand discrete corrections in the field is impossible without a major investment in computer resources. The present invention, however, stores an equivalent amount of information with just 12 coefficients in 72 bytes of memory. So field calibration becomes practical, and expense is dramatically reduced.

Another major advantage of the reduced memory requirements is that internal memory, on board the processor 18 itself, may be used. This memory is small and expensive, but very fast compared to having separate memory chips accessed through special memory controllers. Thus, the correcting circuits of the present invention can be very fast, updating the output at more frequent intervals than previously possible.

Figure 2:
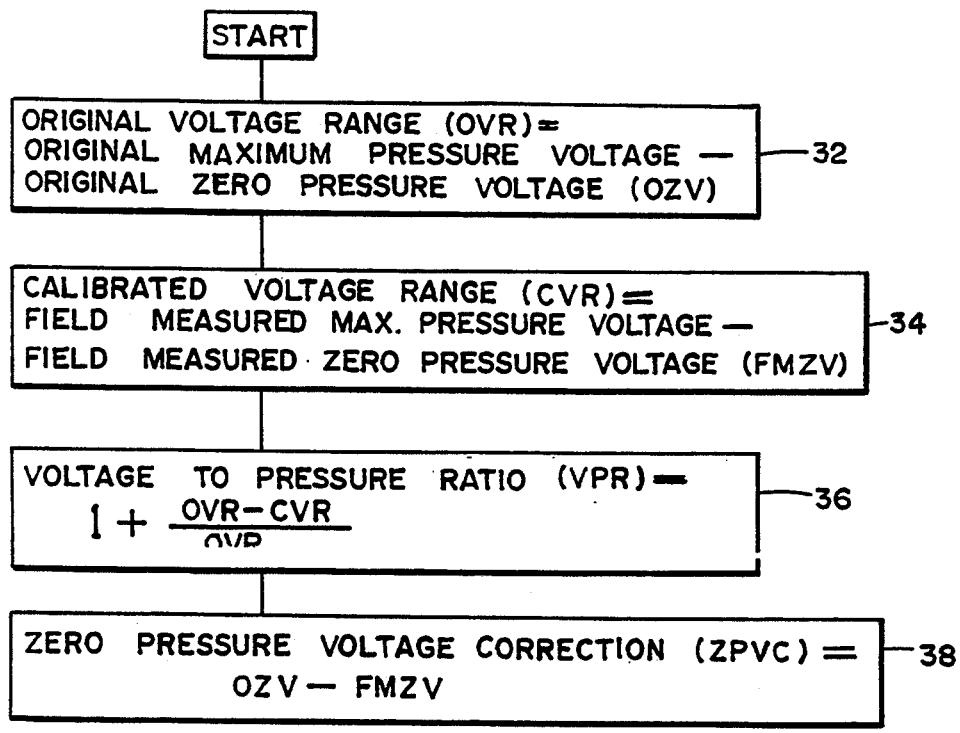
FIG. 2 is a flow chart showing the procedure, method, and program utilized by the circuits of FIG. 1 to recalibrate the sensor in the field.

In FIG. 2, a flow chart shows the method and procedure followed by processor 18 at boot up to determine any new values that may have been stored in memory 20, during a field recalibration, for the zero pressure output voltage and for the first order ratio of voltage change with pressure. It is not really necessary to recalibrate the sensor with respect to the output voltage change due to the pressure squared and pressure cubed terms although this could be done if desired. In the first step, outlined in box 32, the original output voltage range (OVR) is calculated by subtracting the original zero pressure voltage (OZV) from the original maximum pressure voltage. These original zero and maximum voltages are stored in memory 20 at the time of manufacture and remain available throughout the life of the sensor.

In step 2, box 34, the calibrated voltage range (CVR) is calculated by subtracting the field measured zero pressure voltage (FMZV) from the field measured maximum pressure voltage. These field measured voltages are inserted in memory 20 by the user during a recalibration in which the output voltages of the uncorrected sensor are measured while known reference zero and maximum pressures are applied to the sensor. If no recalibration has been done, as when the sensor is new, these field values are set the same as the original values by the manufacturer.

Next, at box 36, the first order change of the voltage with pressure, the voltage to pressure ratio (VPR), is calculated by taking the difference between the original and calibrated voltage ranges, dividing that by the original range, and adding this normalized fraction to one. Of course, if no range change has been entered, OVR minus CVR is zero and the ratio remains one.

Finally, in box 38, a zero pressure voltage correction (ZPVC) is calculated by subtracting the field measured zero voltage from the original zero voltage. These values were obtained in boxes 32 and 34.

Figure 3:
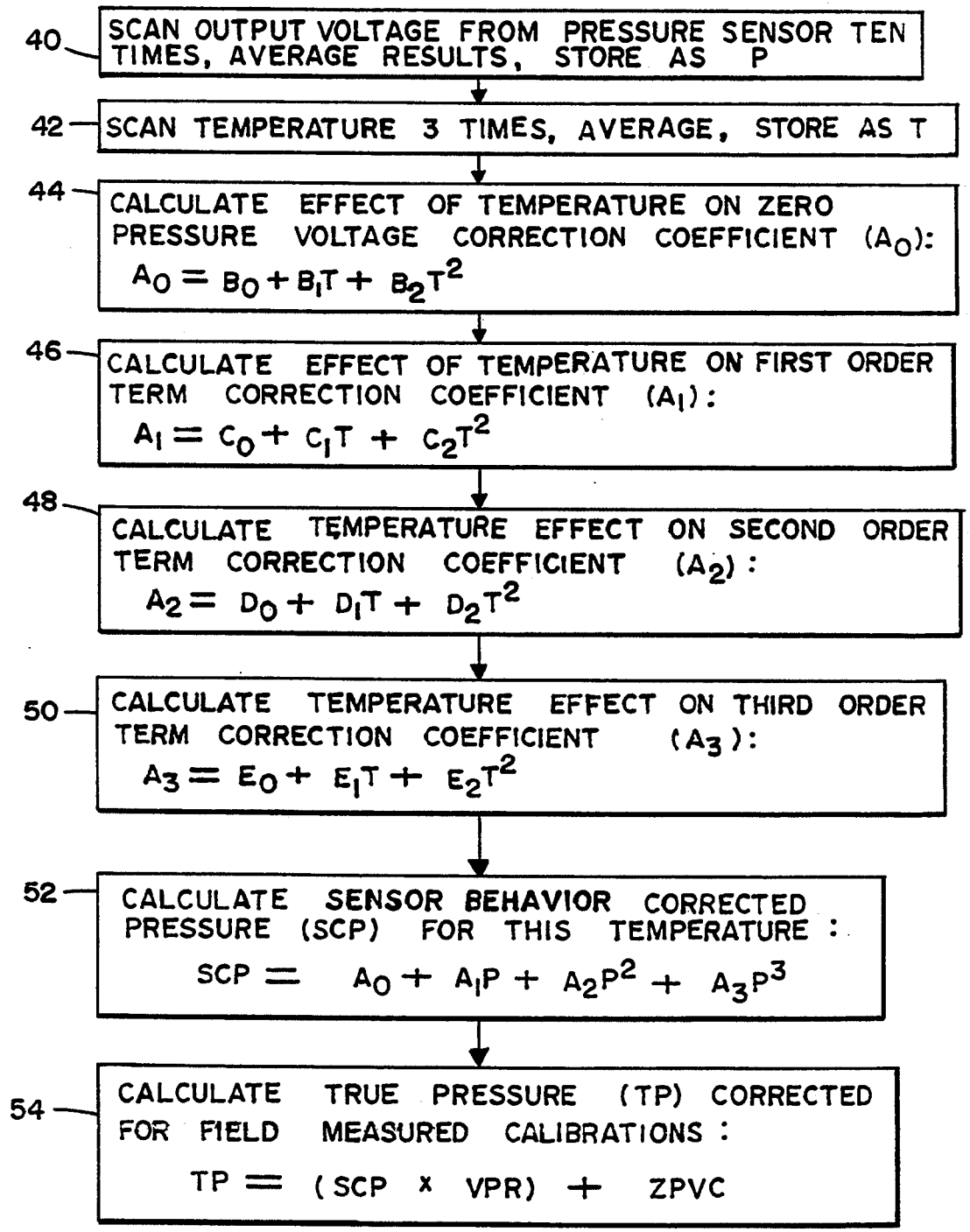
FIG. 3 is a flow chart showing the procedure, method, and program followed by the invention, on a repetitive basis, to update the sensor and correct for all inherent and environment induced errors.

FIG. 3 shows the method and procedure followed by processor 18 after boot up, on a repetitive basis, to produce a corrected and updated output about every ten milliseconds in the preferred embodiment. First, as shown in box 40, the output voltage from sensor 10 is sampled ten times and the results are averaged to eliminate the effect of any noise. This value is stored as the uncorrected pressure P. The temperature is scanned three times, averaged, and stored as T. In box 44, the zero order term coefficient $A_0$ for the sensor behavior characterizing equation is calculated from the temperature T and the three stored temperature effect coefficients $B_0$, $B_1$, and $B_2$. The next three steps, shown in boxes 46, 48, and 50, are similar calculations of the first, second, and third order term coefficients of the sensor behavior characterizing equation. Coefficient $A_1$ is derived from three temperature effect coefficients $C_0$, $C_1$, and $C_2$. Coefficient $A_2$ is calculated from temperature effect coefficients $D_0$, $D_1$, and $D_2$. Coefficient $A_3$ is generated from $E_0$, $E_1$, and $E_2$.

As shown in box 52, the sensor behavior characterizing equation is now evaluated using the sensor output voltage P and the four sensor behavior coefficients derived above so as to yield the sensor corrected pressure (SCP). Finally, to take into account any changes inserted by a field calibration procedure, the SCP is multiplied by the voltage to pressure ratio VPR, derived in FIG. 2, and summed with the zero pressure voltage correction ZPVC to produce the true pressure TP as shown in box 54.

A number of additional functions are performed but not included in the flow charts to maintain clarity in the drawings. The processor 18 provides command signals to switches 24 to provide contact closure at user programmable setpoints. Also, the TP signal is sent to converter 28 to produce a 4-20 milliamp process output 26 which is fed back to the processor 18 through multiplexer 14 to detect any errors in the analog current output 26. Pressure values that are overrange generate error messages to the user.

Clearly, many variations may be made to the invention without departing from the spirit and scope thereof. More than four sensor behavior coefficients could be used to employ higher order terms but the increased accuracy may not justify the increased calculation time and reduced sampling rate. More than twelve temperature coefficients are also a possibility with similar caveats. Hence, limitation is intended only in accordance with the appended claims and their equivalents.

We claim:

1. A self-calibrating sensor with an output electronically corrected for inherent and environmentally induced errors comprising in combination:

sensor means adapted to produce an output value indicative of a measured physical quantity;

an environmental variable sensing means adapted to produce an output signal indicative of a measured independent environmental variable;

said sensor means and said environmental variable sensing means forming a set;

first means to calculate a multiple order sensor behavior characterizing equation for said set that relates the corrected output to said sensor means output, using said sensor means output value and a sensor behavior coefficient for each term of said sensor behavior characterizing equation;

second means to calculate a plurality of multiple order coefficient behavior characterizing equations for said set that relate said sensor behavior coefficients to said independent environmental variable, using said environmental sensing means output signal and an environmental variable effect coefficient for each term of said coefficient behavior characterizing equations, and in which said multiple order sensor behavior characterizing equation comprises a third order, four term equation, using four sensor behavior coefficients;

memory means adapted to store in only 72 bytes of memory said environmental variable effect coefficients comprising twelve temperature effect coefficients for the sensor of said set, and in which each of said multiple order coefficient behavior characterizing equations comprises a second orders, three term equation, using three of said twelve temperature effect coefficients stored in said memory; and corrected output means connected to receive the corrected output calculated by said first means and produce a corrected output characterized for said set.

2. The sensor of claim 1 including user interface means connected to said memory means so as to allow a user to control said first means to calculate and said second means to calculate and also to recalibrate said sensor in the field by loading new zero and full scale pressure output voltages into said memory means.

3. The sensor of claim 2 including user programmable output switch means connected to said corrected output means and said interface means.

4. The sensor of claim 3 including a digital to analog converter connected to said corrected output means so as to produce an analog current proportional to the corrected output.

5. The sensor of claim 1 including user programmable output switch means connected to said corrected output means and said interface means.

6. The sensor of claim 1 including a digital to analog converter connected to said corrected output means so as to produce an analog current proportional to the corrected output.

7. The self calibrating sensor of claim 1 in which said sensor means comprises a pressure sensing transducer and said environmental variable sensing means comprises a temperature sensing device.

8. The sensor of claim 7 including user interface means connected to said memory means so as to allow a user to control said first means to calculate and said second means to calculate and also to recalibrate said sensor in the field by loading new zero pressure outputs and new full scale pressure outputs into said memory means; and user programmable output switch means connected to said corrected output means and said interface means and a digital to analog converter connected to said corrected output means and said interface means.

9. The sensor of claim 8 including user programmable output switch means connected to said corrected output means and said interface means.

10. The sensor of claim 9 including a digital to analog converter connected to said corrected output means so as to produce an analog current proportional to the corrected output.

* * * * *